United States Patent [19]

Albrecht

[11] 4,087,167
[45] May 2, 1978

[54] DUAL PHOTOGRAPHIC SLIDE PROJECTOR

[75] Inventor: Hermann Friedrich Albrecht, Hotzum, Germany

[73] Assignee: Rollei-Werke Franke & Heidecke, Brunswick, Germany

[21] Appl. No.: 718,619

[22] Filed: Aug. 30, 1976

[30] Foreign Application Priority Data

Sep. 4, 1975 Germany .............................. 2539360

[51] Int. Cl.$^2$ ............................................ G30B 23/04
[52] U.S. Cl. ....................................... 353/116; 353/94
[58] Field of Search ...................... 353/9, 116, 94, 83, 353/92, 89, 82, 93, 117, 112, 113, 103

[56] References Cited

U.S. PATENT DOCUMENTS

| 3,006,243 | 10/1961 | Zillmer ................................. 353/116 |
| 3,059,360 | 10/1962 | Krauskopf ............................. 353/116 |
| 3,143,036 | 8/1964 | Rohmann ............................... 353/116 |
| 3,161,109 | 12/1964 | Carrillo ................................. 353/116 |
| 3,462,215 | 8/1969 | Floden .................................. 353/103 |
| 3,468,603 | 9/1969 | Kovarik et al. ....................... 353/116 |
| 3,501,232 | 3/1970 | Jackson ................................. 353/94 |

FOREIGN PATENT DOCUMENTS 268,720  2/1969  Austria.

*Primary Examiner*—Richard E. Aegerter
*Assistant Examiner*—John W. Shepperd
*Attorney, Agent, or Firm*—Stonebraker, Shepard & Stephens

[57] ABSTRACT

A dual or twin projector arranged to take picture slides from a single magazine located between the two projectors, and to return the slides to the same magazine after projection, in proper order ready for another projection operation. The planes of the picture gates of the two projectors are slightly staggered or offset from each other in the direction of the optical axis, preferably by a distance equal to the spacing of the slides in the magazine, so that, for certain types of operation, one slide may be fed from the magazine to one projector simultaneously with the feeding of the next slide from the magazine to the other projector. The projectors, or at least their optical systems, are adjustable laterally so that, for one mode of operation, both projectors will project pictures onto the same area of the viewing screen, for lap dissolve or fade-in-fade-out operation, or in another mode, the two projectors will project pictures onto the viewing screen in side-by-side relation, permitting panoramic viewing or stereoscopic viewing, as desired. Motor driven gearing is provided for transporting slides from the magazine to the respective gates of the respective projectors, and back to the magazine, and for causing the transport or feeding of the magazine itself in proper synchronization with the slide transport, the gearing being readily adjustable to produce, as desired, either alternate feeding of slides to the two projectors, for lap-dissolve mode of operation, or simultaneous feeding of slides to the two projectors, for panoramic or stereoscopic mode of operation.

8 Claims, 5 Drawing Figures

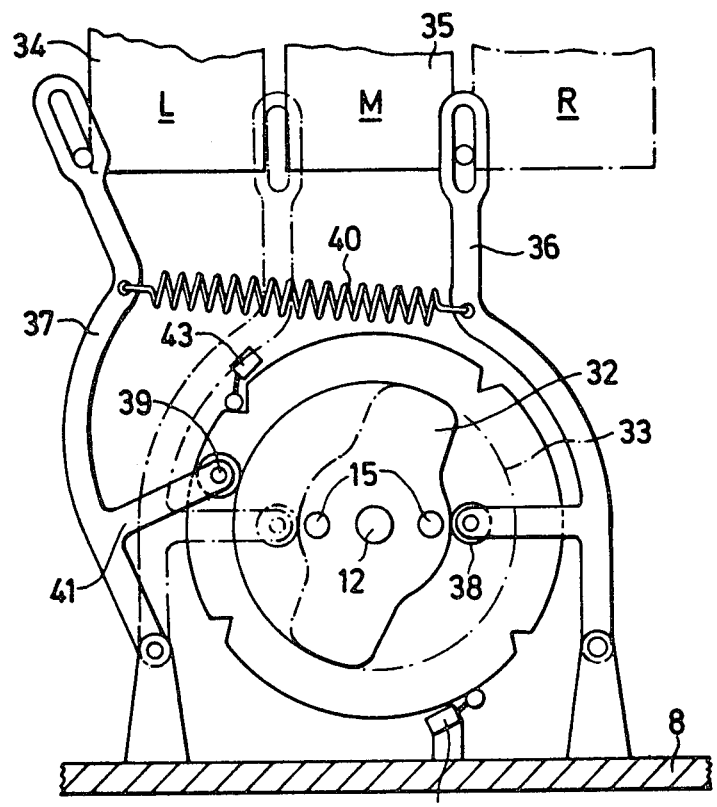
Fig. 3
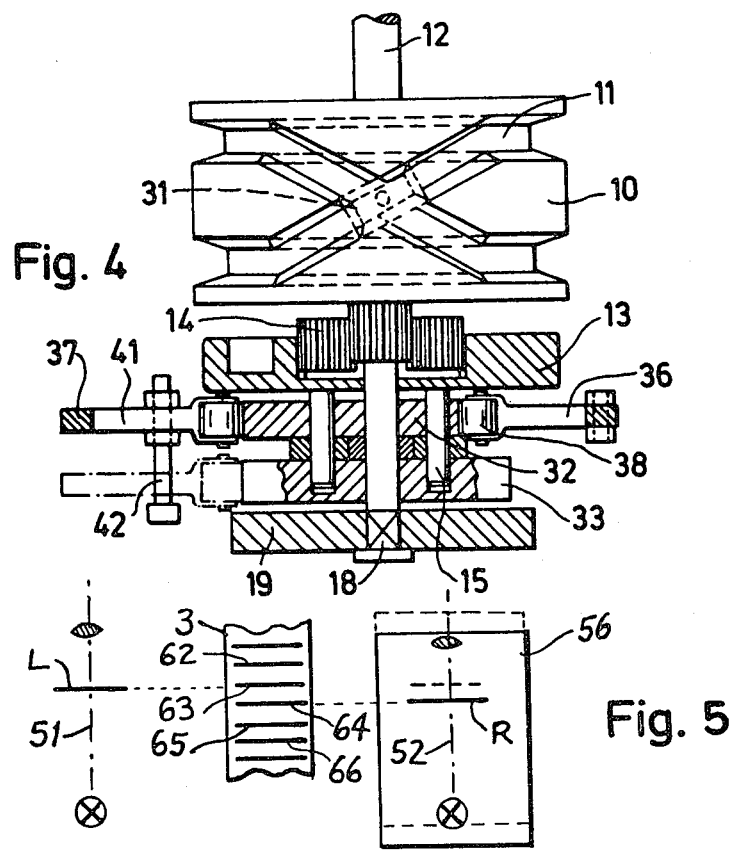
Fig. 4
Fig. 5

DUAL PHOTOGRAPHIC SLIDE PROJECTOR

BACKGROUND OF THE INVENTION

The invention relates to the projection of picture slides or diapositives onto a viewing screen. It is known in the art to use two separate projectors with separate magazines, for projecting pictures onto the same viewing screen with a lap-dissolve effect the picture from one projector fading out as the picture from the other projector becomes visible, thus producing a pleasing change of scene without an intervening interval of darkness or of brightly illuminated screen with no picture on it. The objection to such an arrangement is that the slides in the magazine of one projector must be very carefully placed with relation to the slides in the magazine of the other projector, in order to project the pictures in the desired sequence.

It is also known to use twin projectors fed from a single magazine, with the advantage that the slides can be arranged in the magazine exactly in the desired order of projection, avoiding the extra trouble of having to correlate slides in one magazine with those in another. An example of this arrangement is Carrillo U.S. Pat. No. 3,093,030 of June 11, 1963. The disadvantage of this arrangement is that the slides must be fed by hand, rather than mechanically, and that the slides are not returned to the magazine after projection, so that they must be manually rearranged in the magazine before the next projection sequence. Another example of twin projectors fed from a single magazine is Sobotta U.S. Pat. No. 3,847,472, granted Nov. 12, 1974. This has the advantage of depositing the slides back into the magazine in proper sequence, but the disadvantage of a somewhat complicated and expensive construction with picture gates that move axially forwardly and backwardly from loading position to projection position and vice versa.

The two closely related patents of Floden, U.S. Pat. Nos. 3,462,215 of Aug. 19, 1969, and Jackson, 3,501,232 of Mar. 17, 1970, disclose other arrangements for feeding successive slides from a single magazine alternately to two separate projection gates, and then returning the slides in proper sequence to the same magazine. However, the constructions shown in these two patents cannot be used for lap-dissolve operation, and also cannot be used for either panoramic viewing or stereoscopic viewing of two pictures projected side by side.

Another example of a dual projector system is the patent of Grenier, British Pat. No. 1,158,150, published July 16, 1969. In this patent, slides from the same magazine are fed to the two projection gates, and there is provision for lap-dissolve operation, and also for panoramic operation and for stereoscopic operation. However, the feeding and recovery of the slides must be performed by hand, and there is no disclosure of any way of providing for motor driven operation.

An object of the present invention is the provision of an improved dual slide projector which overcomes the difficulties or drawbacks above mentioned, and which provides for motor driven operation in any one of three modes, either with fade-in-fade-out or lap-dissolve projection of successive pictures onto the same area of the viewing screen, or for panoramic projection of separate pictures in side-by-side relation on the viewing screen, or for stereoscopic projection of related stereoscopic pairs of pictures onto the same area of the viewing screen, using appropriate polarizing means or other stereoscopic devices as well understood in the art.

Another object of the invention is to provide such a dual projector of the kind just mentioned, having provision for quick and easy changeover from one mode to another mode of operation, the slides in all modes of operation being taken successively from a single magazine, and after projection, being returned to that magazine in the original sequence, so that the magazine is immediately ready for reuse in another projection operation, without having to rearrange the slides in the magazine.

Still another object is to provide such a dual projector of relatively simple design, comparatively inexpensive to manufacture, and trouble-free and sturdy in use.

BRIEF DESCRIPTION OF THE DRAWINGS

FIG. 3 is a somewhat diagrammatic or schematic side elevational view of the operating means for the slide changing parts;

FIG. 4 is a plan view, with parts in horizontal section and parts broken away, of the drive gearing for both the slide changer and the magazine transport device; and FIG. 5 is a schematic plan view particularly illustrating the axial staggering or offsetting of one projection gate relative to the other projection gate.

DESCRIPTION OF THE PREFERRED EMBODIMENT

Figure 1:
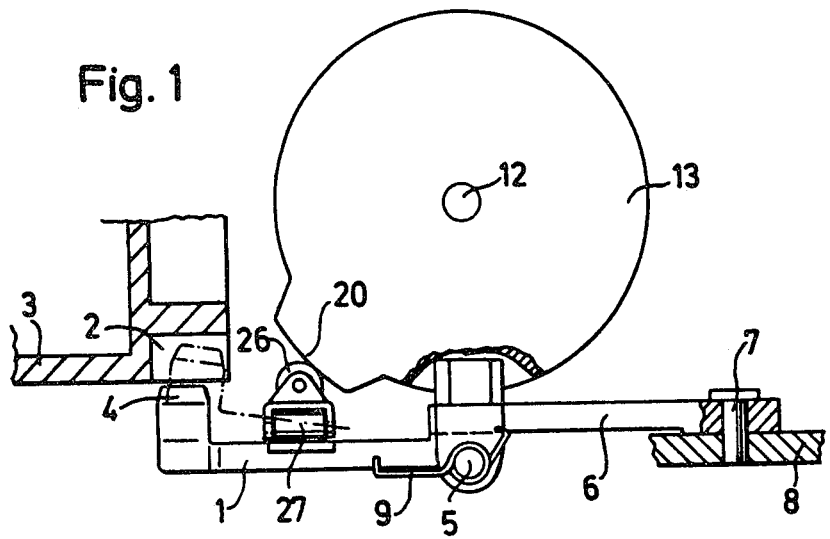
FIG. 1 is a side elevational view, with parts broken away and parts in vertical section, of mechanism for moving the slide magazine, according to a preferred embodiment of the invention.

The optical parts of the present dual projector, as well as the mechanical construction of the projection gates and of the magazine and of the slide carriers or changers for transporting a slide from the magazine to a projection gate and back from the projection gate to the magazine, are conventional and well known in the art, so are not illustrated here. It is sufficient to say that two conventional projectors are mounted side by side, with a space between them for receiving a single magazine of a known type having individual compartments for individual slides, the magazine being so constructed that slides may be removed laterally from either side of the magazine, thus enabling one slide to be moved by a conventional slide carrier from one compartment of the magazine to the projection gate of the left projector, for example, and enabling the next successive slide to be removed by a conventional slide carrier from the magazine to the projection gate of the right hand projector, for example. As above indicated, this much is well known in the art. Also, it may be mentioned that conventional means is provided for adjusting the orientation of the two projectors slightly relative to each other, or at least adjusting the orientation of their projection lens systems, so that the optical axes of projection of the two projectors will converge slightly toward each other to intersect at the viewing screen, if the projectors are to be used for lap-dissolve projection of successive pictures projected onto the same area of the viewing screen, or to be used for projection onto the same viewing area of stereoscopic pairs of pictures, and may be adjusted so that the projection axes will diverge slightly from each other if separate pictures from the two projectors are to be projected onto the screen in side-by-side relation for panoramic viewing.

An important feature of the present invention is that the two projection gates of the two projectors are in transverse planes which are staggered or offset from each other in the direction of the optical axis of projection, instead of being exactly in the same plane. This is illustrated schematically in FIG. 5, where a fragment of the magazine is shown at 3, the optical axis of the left hand projector is indicated at 51, and the optical axis of the right hand projector is indicated at 52. Successive picture slides in the magazine, each in its individual compartment, are indicated schematically at 61, 62, 63, 64, etc. The projection gate of the left hand projector is shown schematically at L, and that of the right hand projector at R. It will be noted particularly that one projection gate is staggered or offset rearwardly relative to the other projection gate, through a distance equal to the spacing of the slides in the magazine 3. This is an important feature in speeding up the projection operation when the projector is to be used for simultaneous projection of two pictures, as in the panoramic mode or the stereoscopic mode. Because of this staggering or offset, the two slide changers can operate simultaneously rather than successively, removing the two slides already projected from the respective gates L and R and returning them to their proper compartments in the magazine 3, and then (after the magazine has advanced two steps) simultaneously taking the next two slides from the magazine and placing them in the respective gates L and R. This greatly reduces the dark time interval, compared with what would be required if the right and left slide changers had to operate successively, with required intervening time for movement of the magazine.

Although axial offsetting of one projection gate relative to the other, as above described, is an important feature of the invention in its broader aspect, and has the advantages above mentioned when the projector is used in the stereoscopic mode or in the panoramic mode, yet it is within the scope of the invention, in certain of its aspects, to have the two projection gates located in the same transverse plane, instead of being offset or staggered relative to each other. This can be accomplished rather easily by mounting one of the projector units on a sliding carriage movable axially forwardly and backwardly through a distance equal to the spacing of the slides in the magazine. When the carriage is adjusted so that the two projection gates of the two projector units are in the same transverse plane, the magazine feeding mechanism described below will feed the magazine along its track or guideway between the two projector units, with a "pilgrim step" movement, two steps forward and one step backward and then two steps forward again, etc., so that successive picture slides may be fed from the magazine successively to the respective left and right projector units and will be returned to the magazine in their original sequence. Such a carriage for mounting one of the projector units for slight forward and backward movement is shown schematically at 56 in FIG. 5. When the carriage is adjusted so that the projection gate of the projection unit on the carriage is offset one step or space relative to the projection gate of the other projector unit, as illustrated in FIG. 5, then the magazine feeding mechanism described below can be adjusted to feed the magazine in a different way, with a modified pilgrim step movement when the projector is to be used in the fade-in-fade-out or lap-dissolve mode, or simply to feed the magazine forward intermittently two steps at a time, when the projector is to be used for projection in the stereoscopic mode or in the panoramic mode.

Figure 2:
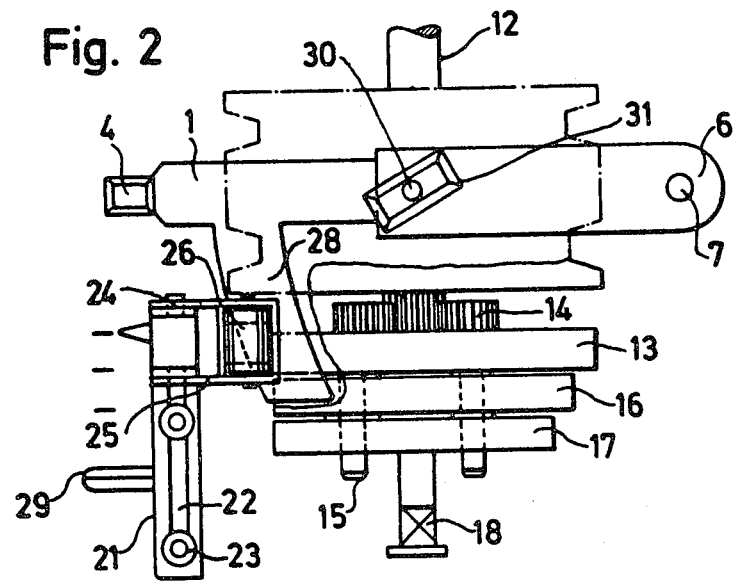
FIG. 2 is a plan view of the parts shown in FIG. 1, with some parts omitted and additional parts shown.

Reference is now made to FIGS. 1 and 2, illustrating the mechanism or gearing for causing the feeding or transport movement of the magazine 3 along its track or guideway located between the two projectors. The magazine, fragmentarily shown at 3, has the customary toothed rack schematically shown at 2, running along one lower edge of the magazine in the conventional manner. A feeding member or claw 1 has at one end an upstanding tooth 4 adapted to engage the teeth of the rack 2 on the magazine. The opposite end of the claw member 1 is pivotally mounted by the horizontal pivot 5 on one end of the horizontally swinging lever 6, pivoted to swing on the vertical pivot 7 on a fixed member 8, such as a frame member or base plate of the projector assembly. A spring 9 tends to raise the claw member 4 on its pivot 5 to the dotted line position shown in FIG. 1, so that the tooth 4 will engage the teeth of the rack 2. Then, if the lever 6 be swung horizontally on its pivot 7, the magazine 3 will be fed or transported. However, if downward pressure is applied to the claw 1, against the force of the springs 9, the upper end of the tooth 4 can be depressed to an elevation below the bottom of the magazine 3, and when the claw is held down in this position, shown in full lines in FIG. 1, the swinging movement of the lever 6 will not affect the magazine.

Ordinarily, the pitch of the teeth of the rack 2 corresponds to that of the magazine compartments. However, this is not necessarily so, because the amount of feeding of the magazine for each swinging stroke of the lever 6 depends only on the distance of travel of the tooth 4 during the time that it was engaged with the rack, and disregarding the travel of the tooth 4 during the time that it was depressed to be out of contact with the rack. Hence the teeth of the rack can be of any appropriate pitch, either a multiple or a fraction of the spacing of the picture slide compartments in the magazine.

For swinging the lever 6 in order to feed the magazine, the lever carries a vertical pivot 30 on which is mounted a slide block 31 engaging in a helical groove 11 of the feeding disk 10 which is fixed to and turns with the shaft 12, driven from a conventional electric motor (not shown). The groove 11 in the disk 10 is developed as an endless screw groove which closes upon itself, in the manner schematically illustrated in FIG. 4. When the feeding disk 10 makes one revolution, the slide block 31 will follow the helical groove in such manner that the feeding lever 6 is swung first through a full swinging stroke in one horizontal direction and then through a full return stroke in the opposite horizontal direction. This will or will not result in feeding of the magazine 3, depending upon whether and for how long the tooth 4 is engaged in the rack 2 of the magazine, and whether and for how long it is disengaged from the rack. In this way, the result may be obtained that upon two revolutions of the feeding disk 10, the feeding claw 1 carries out two complete transport movements or steps, compelling the magazine to move through two spaces, when the claw tooth 4 is held in engagement with the magazine rack during the claw feeding movements in one direction and disengaged from the rack during the claw feeding movements in the opposite direction.

On the drive shaft 12 there is freely supported a cam plate 13. It is connected by a step down gearing, for example a planetary gearing 14 located largely within the cam disk 13, with the grooved feeding disk 10, in such manner that the cam disk 13 makes one complete revolution for four complete revolutions of the grooved feeding disk 10. The cam disk 13 is provided with pins 15 extending parallel to each other and to the drive shaft 12. Any selected one or more of the further control disks 16 and 17 can be seated on the pins 15, thereby causing such control disks to rotate with the cam plate 13. The drive shaft 12 is provided at its outer end with a driving shape or formation, such as a groove or a square 18, on which an additional control disk 19 or a plurality of such disks may be placed if desired, so that such disk or disks will be driven by the shaft 12 jointly with the grooved feeding disk 10, as distinguished from the control disk mounted on the pins 15, which would be driven at one quarter of the speed of the shaft 12 and disk 10, on account of the step down gearing 14.

Referring now to FIG. 2, a changer 21 is provided with a slot 22 extending parallel to the shaft 12, this slot embracing fixed pins 23 which serve as guides for movement of the changer 21 parallel to the shaft 12. A yoke 25, pivotally mounted on the changer by a pivot 24, carries a top roller 26 whose axis is parallel to the shaft 12, and a bottom roller 27 whose axis is in a plane perpendicular to the shaft 12. This roller 27 may roll on an extension 28 of the feeding claw member 1. The upper roller 26 engages the periphery of the cam disk 13, or of another control disk 16 or 17, depending upon the position of the shifter 21. It may be easily shifted from one position to another by means of the handle 29.

The peripheries of the control cam plate or disk 13 and the supplementary control disks 16 and 17 are suitably shaped to engage the roller 26 to depress the claw 1 at appropriate times, depending upon the mode of operation desired. For example, as seen in FIG. 1, the cam plate or disk 13 is provided with an extension 20. During the rotation of the cam plate 13, when the extension 20 comes opposite the roller 26 of the shifter, it depresses this roller, thus depressing also the yoke 25 and the roller 27 so that the latter depresses the extension 28 on the claw 1, moving the claw down to an ineffective feeding position. So long as this extension 20 engages the roller 26 and holds it down, the swinging of the feeding lever 6 as a result of the action of the helical groove 11 will not cause movement of the magazine. When no extension on a control cam or disk is engaged with the roller 26, then the spring 9 holds the claw 1 in its upper position, engaged with the rack on the magazine, so that any swinging of the feeding lever 6 at this time is transmitted to the magazine. Suitable cam formations on the peripheries of the cam disks 16 and 17 are designed to produce the desired action of engaging or disengaging the claw 7, to provide whatever kind of feeding operation of the magazine is desired, depending upon the adjusted position of the shifter 21, which determines which of the various cams will be engaged by the roller 26 of the shifter. In this way, one can shift easily to a different claw program, for example, one claw program for providing ordinary pilgrim step movements if the projector units are adjusted to have their respective projection gates in the same transfer plane, or a different program if the projector units are adjusted to have their respective projection gates offset axially from each other, with fade-in-fade-out projection. Similarly, the cam formation can provide for suppressing all rearward magazine transport strokes, feeding the magazine only forwardly two steps at a time, when the projector is to be used in the stereoscopic mode or the panoramic mode, with simultaneous slide change. Also, one of the control cams may be shaped to suppress the first double transport step of the magazine, upon insertion of a fresh magazine, in order to bring the first two slides into the gates before the regular required operation becomes active or operative.

The actual slide changer drive is shown schematically in FIG. 3. For this purpose, control disks or cams 32 and 33 are provided, which may be placed on the same drive pins 15 previously mentioned, so as to rotate together with the cam disk 13. The cam 32 controls the normal alternating slide change. The two slide changers of conventional construction, schematically shown at 34 and 35, can move the picture slides from the middle or magazine position shown at M to the projection gate positions shown respectively at L and R. The conventional slide changers are pivotally connected to the claws or operating levers 36 and 37, which respectively carry rollers 38 and 39 which are pressed against the control cam disk 32 by the spring 40. During one revolution of the control cam disk 32, one picture slide is conducted from the magazine to one projection gate and remains there until the slide change process takes place on the other side, that is, the next slide is transported from the magazine into the other projection gate. In this process, the slides are temporarily in the two gates simultaneously. The cam 32 therefore controls both of the claws or shifting levers 36 and 37 in such manner that the levers are temporarily simultaneously in their outer positions, with the picture slides in the two projection gates, and are never simultaneously in the middle or magazine position.

When it is desired to achieve simultaneous operation of the two slide changers (to speed up the operation, when projecting according to the stereoscopic mode or the panoramic mode, the two projection gates being in their offset positions) a second cam disk 33 is provided, similar to the first cam disk 32 but oriented 180° with respect to the first cam disk. Either the entire operating lever 37, or at least the extension portion 41 thereof bearing the roller 39, is displaceable in a direction parallel to the shaft 12 (which is substantially parallel to the optical axis) so that the roller 39 can be made to ride on the periphery of the second cam disk 33 rather than the first cam disk 32. This may be accomplished by providing an elongated pivot pin or stub shaft 42 constituting the pivot on which the lever 37 is mounted, and by sliding the lever 37 along this shaft from the full line position to the dotted line position shown in FIG. 4, where the lever and its roller 39 are opposite the cam 33 rather than the cam 32. In this case, the two levers 36 and 37 which operate the slide changers will be moved simultaneously in opposite directions, both outwardly from the magazine to the respective projection gates, or simultaneously inwardly to replace their respective slides into the magazine. The slide changers do not interfere with each other when they are both in their inward or magazine positions, because at this time the projection plane of one projection unit is offset axially from the plane of the other projection unit, as already explained and as shown schematically in FIG. 5.

This same arrangement for simultaneous operation of both slide changers can also be used to advantage when a fresh magazine is newly inserted into the projector, to accelerate the correct loading of both projection gates by the first two slides in the magazine. This is done in combination with the previously mentioned temporary change in the magazine switching or transport program. Also it is used, as already indicated, for the stereo mode and the panoramic mode, in order to reduce the dark time while both slides are being changed simultaneously instead of successively.

The periphery of one or another of the cam disks, preferably the cam plate 13 or some cam member that rotates with it, is suitably formed by notches or otherwise in a way to operate a plurality of electric switches 43 as the shaft rotates. One switch may serve, for example, to stop the electric motor which drives the shaft 12 (the motor being started again by a manual switch when the person in charge of the projection wishes to finish projection of one scene and move on to the next scene) and another switch may, for example, operate the electric lamps which provide illumination for the picture slides, or operate shutters or adjustable diaphragms, to fade one picture out while the other is fading in, or to darken both projection beams simultaneously while slides are being changed for the stereoscopic mode or panoramic mode of projection.

Also, instead of adjusting the shifter 21 manually by means of the handle 29, and moving the slide changing lever 37 manually along the pivot 42, these shifts or changes can be done electrically or electromagnetically within the skill of the art, once the present disclosure is fully understood. The electrical or electromagnetic change may be accomplished by electric circuit means controlled, for example, by a feeler which extends into the path of movement of the magazine, and which appropriately operates the circuitry when a new magazine is inserted in the projector, or when the magazine completes its passage through the projector.

It will now be appreciated that the present invention provides a dual projector of great flexibility, easily and quickly shiftable from one mode of operation to another mode of operation, the picture slides projected in both of the dual units being taken from the same magazine and being projected in the order in which they are placed in the magazine and being returned in the same proper order to the magazine after projection. It will also be appreciated that the projector is relatively simple, many of the parts being standard parts of known construction, readily available, such as the two projector units themselves with their respective light sources, optical systems, and slide carriers to carry the slides between the magazine and the projection gate of each projector unit. Only comparatively few special parts are needed, and they may be produced relatively economically. The special parts are of such nature, that they are sturdy and will stand up well in actual use.

What is claimed is:

1. A dual photographic slide projector comprising:
   (a) first projection means for projecting an image of a first picture slide in a first projection location along a first optical path,
   (b) second projection means for projecting an image of a second picture slide in a second projection location along a second optical path,
   (c) a single magazine located between said first and second projection means for supplying picture slides to be transferred to and to be returned to the magazine from both said first and second projection locations,
   (d) said magazine serving to hold a series of picture slides at substantially uniform spaced intervals,
   (e) slide transfer means for transferring slides from said single magazine to said first projection location and other slides from said single magazine to said second projection location and for subsequently returning the respective slides from their respective projection locations to said single magazine,
   (f) said first projection location and said second projection location being staggered with respect to each other in the direction of said optical paths so that said first projection location will be opposite one slide in said magazine while said second projection location is opposite a next adjacent slide in said magazine,
   (g) a magazine feed member (1, 6) having a part (4) adapted to engage said magazine in feeding relation thereto,
   (h) rotary drive means (10, 11, 12, 31) for moving said part (4) forward and backward through a distance of at least one of said spaced intervals upon each rotation of said drive means,
   (i) means (9) for engaging said part (4) with said magazine during at least part of the forward and backward movement of said part, and
   (j) control means (13, 20, 26) for disengaging said part (4) from said magazine during movement of said part in one direction,
   (k) said control means including a rotary cam member (13) driven from said rotary drive means (10).

2. A projector as defined in claim 1, further comprising step-down gearing (14) for driving said cam member (13) at a slower rate than said drive means (10).

3. A projector as defined in claim 1, wherein said rotary drive means includes a disk (10) having a helical cam groove (11) and a cam follower (31) riding in said groove and operatively connected to said feed member (1, 6).

4. A projector as defined in claim 1, wherein said control means includes a plurality of rotary cams (13, 16, 17), any one of which may be selectively used to disengage said part from said magazine.

5. Magazine feeding mechanism for feeding a photographic slide magazine of the type having teeth forming a rack extending in the direction in which said magazine is to be fed, said feeding mechanism comprising
   (a) a feeding member having a feeding tooth for engaging said rack on said magazine,
   (b) support means mounting said feeding tooth for swinging movement back and forth about a first pivotal axis to carry said feeding tooth back and forth in a direction along said rack and also mounting said feeding tooth for swinging movement about a second pivotal axis to carry said feeding tooth into and out of engagement with said rack,
   (c) first cam means for swinging said feeding tooth about said first pivotal axis to cause feeding of the magazine to the extent that said feeding tooth is engaged with said rack during such swinging movement of the feeding tooth, and
   (d) second cam means for controlling the extent that said feeding tooth is engaged with said rack during its swinging movement about said first pivotal axis.

6. Feeding mechanism as claimed in claim 5, wherein said first pivotal axis (7) extends approximately perpendicular to the direction of feeding movement of said magazine and said second pivotal axis (5) extends approximately parallel to the direction of feeding movement of said magazine.

7. Feeding mechanism as claimed in claim 5, further comprising spring means (9) tending to swing said feeding tooth on said second pivotal axis in a direction to engage said rack on said magazine, and wherein said second cam means swings said feeding tooth against the force of said spring means to disengage said tooth from said rack on said magazine.

8. Feeding mechanism as claimed in claim 7, wherein said second cam means comprises a plurality of cams (13, 16, 17) selectively operable to swing said tooth according to a selected feeding program.

* * * * *